Dec. 6, 1949     L. SCHWARTZBERG     2,490,326
EGG CRATE FLAT
Filed Dec. 2, 1948
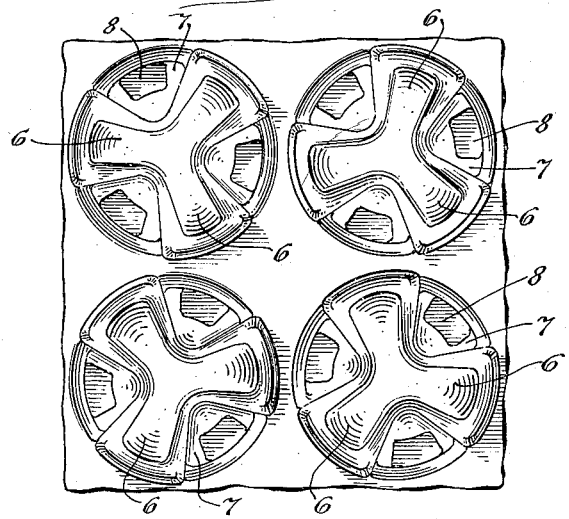
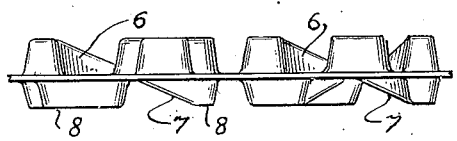
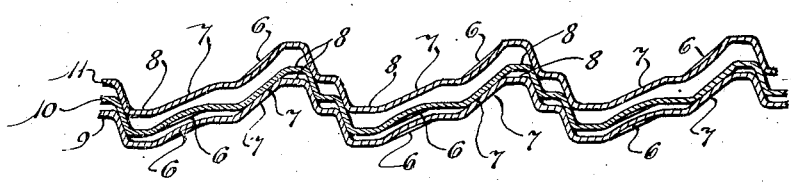
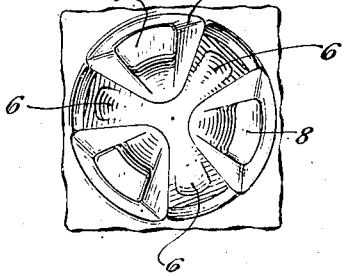
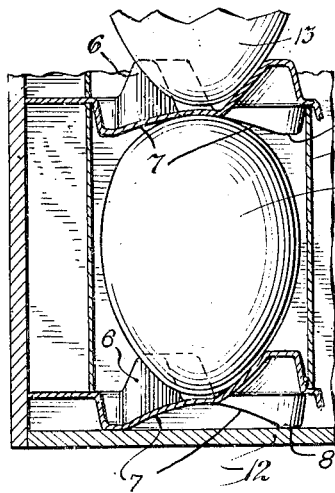
Inventor:
Louis Schwartzberg
Clifford C. Bradbury

Patented Dec. 6, 1949

2,490,326

UNITED STATES PATENT OFFICE 2,490,326

EGG CRATE FLAT

Louis Schwartzberg, Chicago, Ill.

Application December 2, 1948, Serial No. 63,043

3 Claims. (Cl. 217—26)

This invention relates to packing devices called "flats" for separating layers of eggs in shipping and storing crates.

My invention is an improvement upon the structure of my United States Patent No. 2,311,-473, dated February 16, 1943.

When eggs are to be removed from crates, it is customary to lift out one flat with the so-called "filler" and a layer of three dozen eggs which rest upon the flat. When this flat is placed upon a level surface and the filler removed, the eggs may be easily lifted out of the layer. In using the flat of my present invention, the small ends of the eggs are supported within the craters, each defined by three long prongs, which engage the eggs before the lower ends of the eggs seat upon the bottoms of the craters. The prongs extending downwardly from the flat define craters of larger cross-section so that the large ends of the eggs are guided within these downwardly extending prongs. The springiness of the upwardly extending prongs is such that all eggs except very small ones are held with the upper ends of the eggs against the centers of the upper craters. When large eggs are packed, the prongs defining the lower craters are deflected by the pressure of the eggs, and if very large eggs are packed, they will be separated vertically only by the thickness of the material of the flats.

With the structure of my former patent above referred to, the small ends of the eggs rested on the bottoms of the craters, and the prongs did not embrace the eggs in such a manner as to prevent the eggs from tipping when the fillers were removed, it being the purpose of the former structure to have the craters alike for both ends of the eggs. With the use of my improved flat, all of the eggs stand vertically between the prongs forming the lower craters even when the fillers are removed.

In my former patent, the rosettes forming the egg craters are arranged symmetrically about each of the diagonals of square flats so that the flats will nest with one another perfectly in any one of eight positions. In accordance with my present invention, perfect nesting will occur so long as the craters for the small ends of the eggs remain facing in the same direction; that is, in any one of four positions. If the flats are laid together with the craters intended to receive the small ends of eggs facing the craters intended to receive the large ends of eggs, there will be a substantial nesting, but the tall prongs defining the craters for the small ends of the eggs will contact the inner walls of the prongs defining craters intended for the large ends of the eggs before the horizontal portions of the flats meet. The nesting of the flats in this position is sufficient to hold the stacks of flats against lateral shifting, and the many points of contact provide sufficient rigidity to prevent damage to the points even where the flats are bound tightly into bundles. If two flats are laid together with the craters for the large ends of eggs facing one another, the prongs will nest in such a way as to permit the horizontal portions of the flats to substantially contact one another.

My invention is illustrated in the accompanying drawing, in which

Fig. 1 is a plan view of the four central rosettes with the remainder of the flat broken away.

Fig. 2 is a plan view of one of the rosettes showing the opposite side of the flat from that shown in Fig. 1.

Fig. 3 is a section through two flats and through the fillers between flats showing the positioning of an egg between the flats.

Fig. 4 is a section through portions of three flats nested with one another, the lower two flats having like prongs extending in the same direction, and the upper flat having its long prongs facing the short prongs of the lower flats, and Fig. 5 is an edge view of a section of a flat.

The flats of my invention are preferably made of paper pulp by the process of depositing pulp out of a slurry onto a properly shaped screen, either by suction or pressure. The method of making the flats forms no part of my present invention, and, in fact, the flats may be made of other materials such as aluminum or plastic.

It is customary to ship and store eggs in crates holding thirty dozen eggs. Each flat is arranged to support three dozen eggs. The flats are made substantially square and fit into compartments in crates with so-called "fillers" between the flats, thus forming thirty-six cells for eggs between each pair of flats.

In accordance with my present invention, each egg receiving crater is defined by three prongs, and the spaces between prongs which extend upwardly from each rosette form the inner or hollow portions of prongs which extend in the opposite direction on the opposite side of each rosette.

Referring to Fig. 1, the upwardly extending prongs 6 are so shaped that the craters which they define are of slightly less curvature than the small ends of average size eggs, while the downwardly extending prongs 7 define craters of substantially the curvature of the large ends of average size eggs. Each of the prongs 7 has a substantially flat portion 8 which serves to shorten the prongs 7 and provides a larger support for the prongs of the lower flat than if the prongs 7 were more pointed. All of the rosettes on each flat are arranged symmetrically about both the diagonals and diameters of the flats so that when packing the flats for shipment, they will nest together in any one of the four positions in which they may be stacked together if the longer prongs which support the small ends of eggs all face in the same direction. If the flats are reversed so that the longer prongs face the shorter prongs of the adjacent flat, then the flats will nest together imperfectly but sufficiently to prevent the flats from sliding on one another when thus stacked. The perfect nesting is illustrated by the lower two flats 9 and 10 of Fig. 4, and the imperfect nesting is illustrated by the upper two flats 10 and 11 of Fig. 4.

When a crate is packed with flats, fillers and eggs, the shorter projections 7 will rest with their flat portions 8 on the bottom 12 of the crate. The eggs 13 will rest with their smaller ends within the craters formed by the taller projections 6. The lattice-like fillers 14 extend in both directions on top of and resting upon the upper surface of the lower flat. The horizontal portions of the underside of the next flat above rest upon the upper edges of the fillers 14. The flats and fillers are guided against lateral movement relative to one another by the outer edges of the upwardly and downwardly projecting prongs. The upper large ends of the eggs fit into the craters defined by the shorter prongs 7 to hold the eggs in substantially vertical position.

When a crate is filled, the eggs form columns five eggs high, and unless the eggs are very large, the centers of the small ends of the eggs do not quite contact the bottoms of the craters in which they stand. If the eggs are larger than the average size, the prongs supporting the small ends of the eggs bend or spread outwardly to permit the eggs when squeezed into the crate to approach or even actually touch the bottoms of the craters in which they rest.

By shaping the prongs so as to engage the small ends of eggs slightly away from the tips of the eggs, the egs will stand upright on the flat even after the fillers have been removed, whereas if the prongs are shaped to fit the large ends of eggs, the eggs will not stand upright with the filler removed if the eggs are resting upon their small ends.

Although I have shown and described my invention as applied to flats arranged for nesting in any one of a plurality of positions, it is to be understood that my invention is applicable to flats in which the nesting occurs in only one of the four positions in which the flats may be placed together.

I claim:

1. A flat for an egg shipping crate having a plurality of rosettes each formed with three protuberances equally spaced about a common center on opposite sides of the sheet forming the flat, the three protuberances on one side of the sheet being shaped to define a crater corresponding with the large end of an egg, and the projections on the other side of the sheet being shaped to define a crater slightly more acute than the small end of an egg.

2. In a flat for separating layers of eggs in a crate, a plurality of rosettes of prongs extending upwardly and downwardly from the level of the flat, the prongs extending in one direction defining curved craters of slightly less radius than the curvature of the small end of an everage sized hen's egg, and the prongs extending in the opposite direction defining curved craters of substantially the radius of the curvature of the large end of an average sized hen's egg there being substantially flat slanting walls extending from the apexes of the prongs on one side of the flat to the apexes of the prongs on the other side of the flat, the flat being square and the prongs being arranged symmetrically about both diagonals of the square so that when laid together in any one of the eight ways in which two flats may be laid together the prongs of each flat will extend into the hollow portions of prongs of the other flat.

3. A flat for resting upon one and supporting another filler and for separating layers of eggs in a shipping crate having a plurality of egg guiding and filler guiding rosettes each having three upwardly extending prongs and three downwardly extending prongs with substantially flat walls extending from the apexes of the upwardly extending prongs to the apexes of the downwardly extending prongs, the prongs of adjacent rosettes being separated from one another and sloping toward their bases to receive and guide the filler to its place between the rosettes, the upwardly extending prongs being shaped to form craters of slightly less radius than the small ends of average sized hens' eggs, and the downwardly extending prongs being shaped to form craters of substantially the same radius as the large ends of average sized hens' eggs.

LOUIS SCHWARTZBERG.

REFERENCES CITED

The following references are of record in the file of this patent:

UNITED STATES PATENTS

| Number | Name | Date |
| --- | --- | --- |
| 1,687,224 | Oxhandler | Oct. 9, 1928 |
| 2,311,473 | Schwartzberg | Feb. 16, 1943 |